United States Patent [19]

Herrington et al.

[11] 4,293,449

[45] Oct. 6, 1981

[54] HIGH-SURFACE AREA COATED SUPPORT FOR CATALYSTS AND PROCESS FOR THEIR PREPARATION

[75] Inventors: Daniel R. Herrington, Bainbridge; Albert P. Schwerko, Solon, both of Ohio

[73] Assignee: The Standard Oil Company, Cleveland, Ohio

[21] Appl. No.: 176,215

[22] Filed: Aug. 7, 1980

[51] Int. Cl.³ .................... B01J 21/04; B01J 23/88
[52] U.S. Cl. .................................. 252/465; 252/454; 252/461; 252/463; 252/477 R; 423/628
[58] Field of Search ............... 252/454, 461, 463, 465; 423/628

[56] References Cited

U.S. PATENT DOCUMENTS

| | | | |
|---|---|---|---|
| 3,437,605 | 4/1969 | Keith | 252/463 |
| 3,615,166 | 10/1971 | Hindin et al. | 252/462 X |
| 3,798,176 | 3/1974 | Ao | 252/463 X |
| 4,077,912 | 3/1978 | Dolhyj et al. | 252/461 |
| 4,090,982 | 5/1978 | Moser | 252/465 |

*Primary Examiner*—W. J. Shine
*Attorney, Agent, or Firm*—William A. Heidrich; Herbert D. Knudsen; Larry W. Evans

[57] ABSTRACT

A method for preparing a high-surface area catalyst consisting of high-surface area support material coated on an inert core. The inert core is partially wetted with a wetting agent and a powdered, high-surface area coating is then applied to the core. The coated core can be dried and calcined, and additional catalytic elements can be added by impregnating the core with solutions containing such elements.

7 Claims, No Drawings

HIGH-SURFACE AREA COATED SUPPORT FOR CATALYSTS AND PROCESS FOR THEIR PREPARATION

BACKGROUND OF THE INVENTION

1. Field of the Invention

This invention relates to a process for preparing a coated, high-surface area catalyst. More particularly, this invention relates to a method for partially wetting an inert core with a wetting agent, coating the partially wet core with a powdered hydrated form of an oxidic material or other suitable coating, drying and calcining the coated core to give a support with the desired surface area and pore structure, and finally impregnating the support with one or more solutions containing the catalytic species.

2. Description of the Prior Art

Catalysts with a high surface area (abbreviated "HSA") generally consist of active catalytic species bonded to HSA supports. These catalysts are well known and have a myriad of applications in the art. Many such applications involve reactions which are diffusion limited and which therefore require catalysts having a certain minimum particle size. To obtain sufficiently large catalyst particles, the catalytic material is sometimes applied as a coating on an inert core.

Prior art techniques generally involve the application of a HSA coating on a particle by using a slurry of the support material, which may optionally also contain the active catalytic species. For example, Stiles in U.S. Pat. No. 3,513,109 teaches a method for applying catalytic materials to a smooth support by slurrying a finely divided form of the catalytic material in a solution of a metal amine, applying the slurry to the support, then drying and calcining.

Aarons in U.S. Pat. No. 3,554,929 teaches a process for coating a smooth support with an aqueous medium of colloidal boehmite and an activated alumina composition, followed by drying and calcining. The catalytic materials of Aarons can be contained in the coating material or they may be subsequently applied by impregnating the catalyst. It is known that such colloidal sols have an inherent tendency to shrink when drying. This can cause a cracking and spalling of the coating and poor attrition resistance.

U.S. Pat. No. 3,264,228 to Burbidge describes a process for applying a slurried suspension of alumina hydrates to form a thin film coating on a support material. However, such slurry coatings also have inherent disadvantages which include non-uniform coatings and shrinking and cracking of the coating as it dries on the support. Catalytic activity may also diminish whenever the catalytic material is further treated or redispersed with liquids.

U.S. Pat. No. 3,956,377 and U.S. Pat. No. 4,077,912 to Dolhyj et al. teach the coating method of partially wetting a slightly porous inert support, tumbling the wetted support in a powder of catalytic oxides, and then drying and calcining the coated catalyst.

BRIEF SUMMARY OF THE INVENTION

The present invention is a technique for producing a highly active catalyst in a coated form that is also resistant to attrition. According to this invention, an improved HSA catalyst can be obtained by wetting an inert core with a wetting agent, applying a HSA coating or other suitable support precursor to the inert core, and drying and calcining where necessary to produce a support of the desired surface area and pore structure, and subsequently impregnating this calcined HSA support with solutions containing the active or precursors of the active catalytic species. The catalyst prepared by this method is highly resistant to attrition and yet shows higher activity than a catalyst prepared by applying the catalytic oxide powder in a single step. Because the coating is applied as a powdered solid, the problems of shrinkage associated with slurried coatings are eliminated.

DETAILED DESCRIPTION OF THE INVENTION

HSA catalysts, those having about 50 to 500 square meters per gram, typically consist of the active catalytic species bonded to HSA supports such as alumina, silica, alumina-silica, titanium dioxide, zirconia, or thorium dioxide. Such catalysts have a large number of possible applications such as use in auto exhaust catalytic converters and in reactions including alkylation, isomerization, dehydration, dehydrogenation, gas purification, Claus process, chlorination, and in hydrotreating, hydrocracking and reforming. Many of these reactions require a certain minimum catalyst particle size not only because the reactions are diffusion limited but because the catalysts themselves are highly active.

It is possible to prepare an active coated catalyst by applying to the inert core material the HSA oxidic material already impregnated with the catalytic species, as shown in Dolhyj et al. However, once HSA supports or supported catalysts have been prepared in their calcined active form, it is often detrimental to the activity of the catalyst to subject the support material or catalytic material to further treatment by wetting agents, e.g. water or slurries, or to further subject it to additional heat treatment. The result of such treatment is a lowering of the intrinsic surface area and in some cases a decrease in the dispersion of the catalytic species.

According to the present invention it has been found that an improved catalyst can be prepared by withholding the active catalytic species during the coating of the HSA support on the inert core material. By subsequently impregnating with the catalytic component after the coated support has been dried and calcined, a more active catalyst can be obtained.

The present invention can best be described by reference to the catalyst core, the HSA coating, and the technique used to apply the coating to the core, and the application of additional catalytic species to the HSA support.

CATALYST CORE

The core of the catalyst is a substantially inert material that can be of any shape or size that is suitable for its intended use. By the term "substantially inert" is meant those materials which are essentially non-reactive with the process reagents and reactor under the reaction conditions, e.g. those which provide a per pass conversion of less than about five percent in the desired reaction. Preferred core materials in the present invention are generally spherical and have a diameter greater than 20 microns. Especially preferred for use in commercial reactors are those core materials which are spherical with a diameter of about 1/16 to about ½ inches. An especially preferred inert core is Alundum ®, a fused-alumina available commercially from the Norton Chemical Company.

Other suitable core materials may be selected from a wide variety of materials known to be substantially inert in the desired chemical reaction. These materials are normally low-surface area oxides, with preferred supports being silica, alumina, alumina-silica, silicon carbide, titania and zirconia.

The core must be at least partially porous. By "at least partially porous" is meant that the support material must be susceptible to the penetration of a wetting agent. Preferred support materials are capable of adsorbing more than 5%, preferably 10% and more preferably 25% of water or other wetting agent based upon the weight of the support.

HSA COATING

The HSA coating can be any material which is capable of strongly adhering to the wetted inert core to result in a highly porous coating. By "strongly adhering" is meant that the coated catalyst particle will retain most of its coating when vigorously agitated on a 20 mesh screen for three minutes. The amount of coating lost depends upon the peculiar characteristics of both the core and the coating, but losses of less than 30, preferably 20 and more preferably 10 percent by weight based upon weight of the HSA coating alone are considered acceptable.

Some powdered HSA materials used to coat the core may need little or no further treatment to produce a suitable HSA support in final form, i.e. a support that is ready to be impregnated with any desired catalytic elements. However, HSA coatings typically need additional treatment after they have been applied to the core before they will have the desired porosity and surface area. For example, a hydrated form of alumina should be dried and calcined to remove water and establish a larger surface area.

A preferred precursor material is the hydrated form of an oxide such as $Al_2O_3.(H_2O)_z$ or $Na_2SiO_3.(H_2O)_z$ where $z=0.5$ to $3.0$, or mixtures thereof. Other examples of suitable coating materials include titanate or zirconate salts. These hydrates may be subsequently dried and calcined to produce the HSA support.

For purposes of this patent, the term "coating" includes precursors of HSA material which are capable of forming a HSA support upon additional treatment as well as those HSA materials which need no further treatment. As defined for this patent, a "support" means the combination of an inert core as described above and a HSA coating in its final form.

COATING TECHNIQUE

An important feature of the present invention is the method used to coat the catalyst. The core must first be wetted, and a coating in powder form is then added to the partially wetted support. The inventive technique eliminates the need for subjecting the finished form of an active catalyst to any subsequent wetting steps or thermal treatments. In so doing, it is possible to avoid the detrimental effects which often result from a lowering of intrinsic surface area or from a decrease in dispersion of the catalytic species.

This method can be accomplished by a number of different techniques, but the most convenient technique is to partially wet the inert core material with a wetting agent and then roll the partially wet inert core in a powder of the HSA coating. This is suitably done by placing the partially wet inert core in a rotating drum or jar and adding the powdered HSA coating. Preferably, the powdered material is added in more than one portion with rotation or tumbling of the catalyst after each addition to provide even coating of the core. A uniformly coated HSA support is obtained after drying and calcination.

The wetting agent used to coat the inert core is preferably water and can optionally contain a binder or peptizing agent dissolved therein. The inert cores may be wetted by spraying or immersing in the wetting agent. Suitable binders or peptizing agent may be mineral acids, nitrate salts or colloidal sols. To achieve a continuous, strongly adhering coating, it is important that the inert core be only partially wet. The term "partially wet" is defined in U.S. Pat. No. 4,077,912, the disclosure of which is incorporated by reference. Briefly, the core must have adsorbed some liquid, but the surface must be dry to the touch.

ADDITION OF CATALYTIC ELEMENTS

Additional catalytic elements can be added to the support by any convenient method. An example of one technique is to impregnate the support with solutions containing the catalytic elements. This can be done in a single step, or in two or more sequential operations. The catalyst can be dried and/or calcined after each impregnation or after the final impregnation, if desired, although this step is not crucial.

A highly preferred technique for adding solutions to small amounts of the HSA support is to add the solution dropwise while tumbling the support gently. Rough tumbling or rapid addition of the liquid will result in coating deterioration.

Some catalytic species can be considered to be active upon addition to the HSA support. Others may be in the form of catalyst precursors, i.e. those which need some further treatment to initiate or enhance their catalytic activity. Two examples of such treatments are calcination and reduction of the catalyst by in situ activation in the presence of a feedstock. For purposes of this patent, "catalytic species" includes both active and precursors of active catalytic elements.

SPECIFIC EMBODIMENT

Example

A catalyst charge was prepared by coating an Alundum ® support according to the present invention. Specifically, 100 grams of ⅛ inch diameter Alundum ® spheres were treated with a wetting agent consisting of 10 ml 1.78 M aqueous $Al(NO_3)_3$ solution and tumbled in a jar for 10 minutes. Fifty grams of a *powdered hydrated alumina*, $(Al_2O_3.3H_2O)$ were added in five equal portions, tumbling 5 minutes after each addition. The coated product was dried at 110° C. and calcined for four hours at 425° C. The calcined product was treated with 11.5 ml of an aqueous solution containing 4.64 grams ammonium heptamolybdate and 3 ml 15 M $NH_4OH$. After drying at 110° C. for 18 hours, the sample was treated with 11.5 ml of an aqueous solution containing 4.41 grams $Co(NO_3)_2.6H_2O$. The catalyst thus contained 3.0% CoO and 10.2% $MoO_3$ by weight. The product was dried at 110° C. and calcined at 425° C. for four hours.

The catalyst was then placed in a reactor and used to desulfurize a catalytically cracked heavy gas oil (2% decanted oil) which contained 1.14 percent sulfur by weight. The test was conducted at 700° F., 500 psig, and 3500 scf (standard cubic feet) H$_2$/bbl of feed. Liquid hourly space velocity (LHSV), based on volume of feedstock/volume of catalyst/hour, was varied as indicated. The sulfur content of the effluent was measured and percent desulfurization was calculated. The weight of the active catalyst was determined by subtracting the weight of the inert core material from the total catalyst charge. Results of the test were then expressed in weight percent desulfurization per gram of active catalyst in Table I.

TABLE I

INVENTIVE CATALYST
CATALYTICALLY CRACKED HEAVY GAS OIL
(2% Decanted Oil) 1.14 Weight Percent Sulfur

| LHSV (v/v/hr) | Desulfurization: Wt % per Gram of Active Catalyst |
| --- | --- |
| 0.75 | 4.3 |
| 2.0 | 2.5 |
| 3.0 | 2.8 |

COMPARISON A:

Alundum ® spheres of about ⅛ inches in diameter were coated with an active catalytic material according to the one-step process taught in Dolhyj et al. U.S. Pat. No. 4,077,912. Specifically, fifty grams of Alundum ® spheres were treated with a wetting agent consisting of 12 grams of a 30 weight percent colloidal alumina sol and the wetted spheres were tumbled in a jar. A mixture of 50 grams powdered CoO/MoO$_3$/Al$_2$O$_3$ catalyst (3.0 wt % CoO, 15.1 wt % MoO$_3$) and 17 grams Al(NO$_3$)$_3$.9H$_2$O was added to the wet sheres in 2–3 gram portions, the product being tumbled for 5–10 minutes after each addition. The coated catalyst was dried at 110° C. and calcined for four hours at 425° C. This prior art catalyst was then used to desulfurize a light Iranian vacuum gas oil which contained 1.55% sulfur by weight. Test conditions were identical to those in the above Example: 700° F. 500 psig and 3500 scf H$_2$/bbl of feed. Results are shown in Table 2.

TABLE II

PRIOR ART CATALYST
LT IRANIAN VACUUM GAS OIL
1.55 WEIGHT PERCENT SULFUR

| LHSV (v/v/hr) | Desulfurization: Wt % per Gram of Active Catalyst |
| --- | --- |
| 1.0 | 2.9 |
| 2.0 | 2.3 |
| 3.0 | 1.9 |
| 4.0 | 1.6 |

COMPARISON B

Although a comparison of Tables 1 and 2 indirectly shows that the inventive catalyst removed more sulfur per gram of active catalyst than did the prior art catalyst, the tests were run with different feedstocks. To provide a bridge for direct comparison, both feedstocks were desulfurized with the same catalyst.

The catalytically cracked heavy gas oil and light Iranian vacuum gas oil were fed to separate reactors containing a conventional hydrodesulfurization (HDS) catalyst in extrudate form as commonly used in the first stage of a hydrocracker. The reactions were run under identical conditions: at 700° F., 500 psig and 3500 scf H$_2$/bbl feed. The weight of the catalyst charged in both runs was virtually identical (35.4 grams for the heavy gas oil and 35.1 grams for the vacuum gas oil). The weight percent sulfur removed for indicated space velocities is shown in Table 3.

TABLE 3

CONVENTIONAL HDS CATALYST
PERCENT DESULFURIZATION

| LHSV:(v/v/hr) | Heavy Gas Oil 1.14 wt. % S | Vacuum Gas Oil 1.55 wt. % S |
| --- | --- | --- |
| 1.0 | 76.3 | 80.3 |
| 2.0 | 64.0 | 73.9 |
| 3.0 | 61.3 | 64.1 |
| 4.0 | 54.3 | 55.6 |

The above data demonstrates that the catalytically cracked heavy gas oil used in the Example is more difficult to desulfurize than the light Iranian vacuum gas oil of Comparison A. By comparing these results with the data in Table 1 and 2, it will be noted that the inventive catalyst treated a more difficult feedstock and still showed improved desulfurization activity.

The preceding embodiment of the invention is for illustrative purposes only, and should not be construed as a limitation upon the invention. Other variations and embodiments will be apparent to those skilled in the art, and the scope is to be limited only by the following claims.

We claim:

1. A process for preparing a high-surface area catalyst support, the process comprising:
   (i) partially wetting an inert core with a wetting agent,
   (ii) applying a powdered high-surface area coating to the inert core,
   (iii) drying and calcining the coated core to form a support, and
   (iv) adding catalytic elements to the support.

2. The process of claim 1 in which the inert core is fused alumina.

3. The process of claim 2 in which the wetting agent is a solution of aluminum nitrate.

4. The process of claim 3 in which the powdered high-surface area coating is hydrated alumina.

5. The high-surface area catalyst produced by the process of claim 1.

6. A process for preparing a high-surface area catalyst, the process comprising
   (i) partially wetting a fused-alumina core with a wetting agent consisting of aqueous aluminum nitrate,
   (ii) applying powdered hydrated alumina to the wetted fused-alumina core,
   (iii) drying and calcining the coated sphere to form a support,
   (iv) applying solutions containing ammonium heptamolybdate, ammonium hydroxide, and cobalt nitrate to the support, and
   (v) drying and calcining the coated catalyst.

7. The catalyst made by the process of claim 6.

* * * * *